3,002,801
RADAR PREDICTOR STORAGE AND PLAYBACK SYSTEM

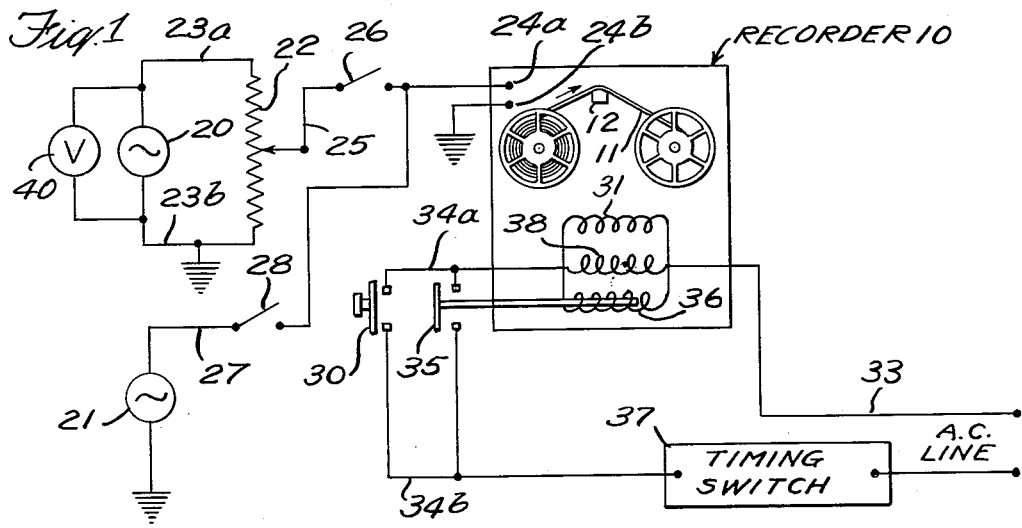
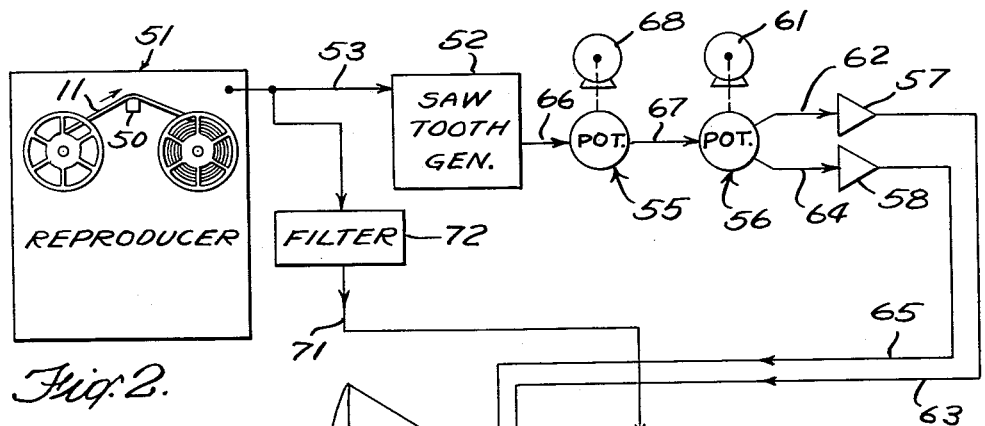
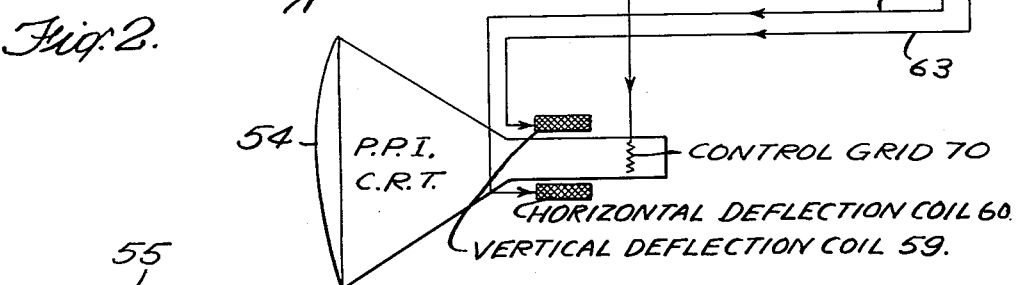
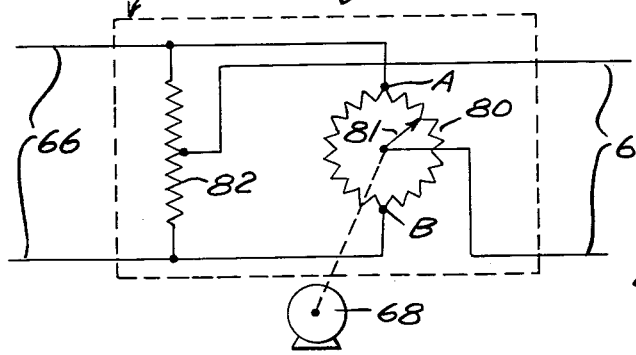

Herbert W. Bomzer, New Hyde Park, Edward Gold, Plainview, and William M. Wirfel, Glendale, N.Y., and Fleur B. Smith, Los Angeles, Calif., assignors to The Sperry Rand Corporation, Ford Instrument Company Division, Long Island City, N.Y., a corporation of Delaware
Filed Apr. 26, 1957, Ser. No. 655,437
2 Claims. (Cl. 346—74)

This invention relates to radar trainers and particularly to a system for storing prediction data in discrete form and visually displaying simulated radar target areas in accordance with available prediction data.

Discrete prediction data implies prediction for discrete target ground areas. A conventional method of presentation is to draw a polar or rectangular grid of the area to be predicted in such a way that each cell of the grid corresponds to a predicted value of radar return. The entire range of predicted return values are quantized into a number of levels and a paint color or shade of gray is assigned to each level. Each cell of the grid is then painted with the appropriate color or shade of gray and the resultant painting is photographed in black and white. The paint colors or the shades of gray of the original painting yield the various shades of gray (from white to black) in the resultant photograph. This conventional method is very tedious and is generally not suitable for producing large numbers of predictions.

A principal object of this invention is to provide a rapid P.P.I. simulation of a radar target area upon a cathode ray tube indicator from known data, the known data being stored on a convenient medium.

As presently contemplated in this invention, there is provided a magnetic tape recorder for the requisite storage system to record successively, along the magnetic tape, the predicted returns for each line of a system of radial azimuth lines superimposed upon a target area. Each of the azimuth lines is divided into a relatively large number of points and each point has a predicted numerical value which represents a relative intensity of radar return, the predicted numerical values being supplied as input data. The prediction for a given azimuth line thus consists of recorded A.C. voltages on the magnetic tape, these voltages being proportional to the predicted numerical value of each predicted point along that azimuth line. The recordings for the adjacent azimuth lines follow successively on the magnetic tape for the entire azimuth line system, the first point of each line being made distinctive by recording an A.C. voltage of a different frequency than that employed for the recording of the other predicted point levels.

The indicator system yields a P.P.I. type radar display as the playback output from the magnetic tape reproducer intensity modulates the control grid of a cathode ray tube. The scope sweep is synchronized with the travel of the segment of tape which represents one azimuth line by employing filter techniques responsive to the distinctive frequency recorded for each first point on each azimuth line. The azimuth sweep rotation of the cathode ray tube is accomplished in the conventional manner by an azimuth motor driving a sine-cosine potentiometer. This process is continued until the entire target area is played back and presented on the scope. A camera may be employed to photograph the scope face for training display purposes.

In the embodiment of the invention a jitter circuit will be disclosed to eliminate the "spoke" effect normally apparent due to the progressively increasing separation between adjacent azimuth sweep lines as the periphery of the scope is approached. This jitter circuit adds an additional two components to the scope sweep, one to the sine component and one to the cosine component, so that the scope spot is oscillated or "jittered" to fill up the radial wedge between adjacent azimuth lines as it moves from the polar center to the periphery of the scope.

The feature of the invention will be understood more clearly from the following detailed description taken in conjunction with the accompanying drawings in which:

FIG. 1 is a schematic diagram of a recording and storage system for available prediction data;

FIG. 2 is a block diagram of the playback and visual display system for recorded magnetic tapes; and FIG. 3 is a schematic diagram for a "dither" circuit.

Referring to the recording and storage system of FIG. 1, 10 represents a magnetic tape recorder having a magnetic tape 11 driven by a motor (not shown) past and in contact with a recording head 12. The energization of the recording head is provided by connections to a 1900 cycle per second A.C. source 20 and to a 675 cycle per second synchronizing signal source 21. A variable potentiometer 22 is connected across the A.C. source 20 by conductors 23a and 23b, the slider of the potentiometer 22 being connected to one recording input terminal 24a of the recorder 10 by a conductor 25 having a series switch 26. The synchronizing signal source 21 is connected to terminal 24a by a conductor 27 having a series switch 28. One terminal of the source 20, the source 21 and the other terminal 24b of the recorder 10 are connected to a common ground so as to complete the electrical circuits.

The procedure for recording available prediction data is accomplished while the motor of the tape recorder is running uninterruptedly. The magnetic tape 11 does not move and no recording occurs until a start push button 30 is depressed which energizes a solenoid coil 31 connected to A.C. line 33 by conductors 34a and 34b, the solenoid coil 31 forcing the tape 11 against a driving "capstan" to start and drive the magnetic tape. Holding relay contacts 35 of a holding relay 36 permit the release of the push-button switch 30 without stopping the moving tape. A timing contactor 37 is connected in series with the A.C. line 33 and the parallel combination of the coil 31, the coil 36 and a solenoid coil 38, the coil 38 actuating the timing contactor 37. The timing contactor 37 is adjusted to provide a 0.3 second running interval for the tape 11 every time that the push button switch 30 is depressed.

The preparation prior to the recording procedure is to superimpose a system of 480 azimuth lines upon a 360° target area, adjacent azimuth line spacing being ¾ degree, and to divide each radial line into 110 points. A number is assigned to each point to represent relatively the predicted intensity of known radar return.

The recording technique is commenced by closing the switch 28 and depressing the push button switch 30 to record a 675 c.p.s. synchronizing signal from the source 21 for a duration of 0.3 second, this signal representing the first point in the first azimuth line. The second point is recorded by opening the switch 28, adjusting the potentiometer 22 until a voltmeter 40 connected across the A.C. signal source 20 indicates a number to represent, on a convenient scale, the available prediction data for point 2 on azimuth line 1, closing the switch 26 and finally depressing the push button switch 30. This procedure is continued until the 110 prediction points are recorded for the first azimuth line. The prediction for the second azimuth line is begun immediately after the completion of the first azimuth line, the first point again being recorded with 675 c.p.s. signal from the synchronizing signal source 21. The operational pattern is repeated until the prediction data for the 480 azimuth lines are recorded on the magnetic tape 11.

The playback and display system is disclosed in FIG. 2 in the block diagram form. The recorded magnetic tape 11 which contains the recorded prediction data for 480 azimuth lines passes a reproducing head 50 of a reproducer 51 at constant speed as driven by a motor (not shown). The output of the reproducer 51 is connected to the synchronizing circuit of a saw tooth generator 52 by a cable 53, the saw tooth generator output voltage controlling the P.P.I. sweep of the cathode ray tube 54. The saw tooth generator 52 sweeps the scope spot from the scope center to the radial extremity in the time that it takes to reproduce the data for one azimuth line. Assuming the same tape speed for recording and reproducing, this sweep time is 33 seconds. The saw tooth generator 52 being responsive to the recorded 675 cycle synchronizing signal for each of the first points of the 480 azimuth lines through the synchronizing connection of cable 53 starts the scope spot at the scope center at the instant of the availability of the prediction data from the tape 11 for all the second points in all the azimuth lines. The sweep system connected to the output of the saw tooth generator 52 comprises a dither potentiometer 55, a sine-cosine potentiometer 56, two sweep amplifiers 57 and 58, vertical deflection coils 59 and horizontal deflection coils 60 of the cathode ray tube 54. The shaft of the sine-cosine potentiometer 56 is driven by an azimuth motor 61 which indexes successive azimuth lines by a ¾° interval every 33 seconds. The sine function output of potentiometer 56 appearing in cable 62 is connected to the input side of amplifier 57, the output side of this amplifier being connected to the vertical deflection coils 59 by a cable 63. The cosine function output of the potentiometer 56 appearing in cable 64 is connected to the input side of amplifier 58, the output side of the amplifier 58 being connected to the horizontal deflection coils 60 by a cable 65. To eliminate an objectionable spoke effect by the progressively greater separation between adjacent sweeps in the radial direction, the input of the dither potentiometer 55 is connected to the output side of the saw tooth generator 52 by a cable 66, the output side of the dither potentiometer 55 being connected to the input side of the sine-cosine potentiometer 56 by a cable 67. When the shaft of the dither potentiometer is driven by a motor 68 at a higher speed than the shaft of the sine-cosine potentiometer 56, the scope spot on the face of cathode ray tube will oscillate or "jitter" being directly proportional to the distance of the scope spot from the scope center. By selected circuit values, the "jitter" will fill the ¾ degree wedge between adjacent azimuth lines to eradicate any "spoke" effect.

For the purpose of intensity modulating the scope spot to display the radar target area in proper relative shading, the output of tape reproducer 51 is connected to the control grid 70 of the cathode ray tube 54 by a cable 71. In order to eliminate the 675 cycle synchronizing signal from the visual presentation on the face of the cathode ray tube 54, a 1900 c.p.s. band-pass filter 72 is connected in the cable 71.

In FIG. 3 is disclosed the schematic details of the dither potentiometer 55, the device comprising a toroidal resistor 80, a radial slider 81 in sliding contact with the resistor 80, the slider 81 being driven by the motor 68, and a center tapped resistor 82 connected across diagonally opposite points A and B of the toroidal resistor 80. The cable 67 is connected between the slider 81 and the center-point of the potential dividing resistor 82 while the cable 66 is connected across points A and B.

The input voltages to the tape recorder 10 need not be adjusted as described. When the predicted returns are available from a computer, these signals can be channeled to the tape recorder to automatically activate the timing and recording circuits for each point as it is computed. For such an automatic system, the computing and recording rates would have to be compatible.

A means of eliminating the "spoke" effect other than by the "jitter" circuit of FIG. 3 is to record the prediction several times successively along the tape and to decrease the scope spot's azimuthal rotation per radial sweep by a factor equal to the number of times the prediction for one azimuth was repeated. For the disclosed embodiment, the "spoke" effect would be reduced if each azimuth line prediction were recorded three times and the rotation of the scope spot reduced to ¼ degree per radial sweep.

The azimuthal rotation of the scope spot can be obtained by a resolver rather than the sine-cosine potentiometer 56. When a resolver is employed, the sweep signal would have to be modulated before application to the resolver and subsequently demodulated.

Tape space and time can be conserved by recording the prediction data at a slow speed and reproducing it at a fast speed.

During the playback operation, the output voltage from the reproducer can be channeled through an integrating system which would effect a smooth function application to the control grid of the cathode ray tube.

A multi-channel tape recorder can be used to record the prediction data along one channel and the corresponding sweep synchronizing signals along the other channel.

While the preferred embodiment as disclosed employed tape for the storage medium of the intelligence in magnetic form, it is intended that the scope of the invention includes the employment of other magnetic media such as wire and disks. Further, a photographic film may be used in other embodiments of the invention in conjunction with optical recorders and optical reproducers.

It is also to be understood that various modifications of the invention other than those above described may be effected by persons skilled in the art without departing from the principle and scope of the invention as defined in the appended claims.

What is claimed is:

1. Apparatus for storing a series of prediction point data in radar trainers operable to visually reproduce said data on a cathode ray tube, comprising a magnetic tape recorder having a recording head, a voltage source connected to the recording head of said recorder, a switch disposed in the connection of said source and said recording head, means for adjusting the output of said source in accordance with the desired intensity of the point data reproduction in the cathode ray tube, a second voltage source set at a substantially different frequency from the first-mentioned source, said second source being also connected to the recording head of said recorder, a second switch disposed in the connection of said second source and said recording head, the recorded frequency of said second source being usable in said trainer for synchronizing the reproduction of the recorded data from said first-mentioned source with the scan of the intensity modulated beam in said cathode ray tube, a power line connected to said recorder, a switch in said power line and a timing switch also in said power line for cutting off the power to said recorder after each point data is recorded.

2. Apparatus for storing a series of prediction point data in radar trainers operable to visually reproduce said data on a cathode ray tube, comprising a magnetic tape recorder having a recording head, a signal source, a voltage source set at a substantially different frequency from said first-mentioned signal source, means for adjusting the voltage output of said second-mentioned source in accordance with the desired intensity of reproducing each point data in the cathode ray tube, means capable of being employed to selectively connect said first-mentioned signal source and said second-mentioned voltage source to the recording head of said recorder, an alternating current line connected to said recorder, a timing switch disposed in said line for opening said line after each point data is recorded, and a make and break switch in said line, and a holding relay also disposed in said line.

References Cited in the file of this patent

UNITED STATES PATENTS

| | | |
|---|---|---|
| 1,826,477 | Olpp | Oct. 6, 1931 |
| 2,637,785 | Charlin | May 5, 1953 |
| 2,698,877 | Abbott | Jan. 4, 1955 |
| 2,878,321 | Davis | Mar. 17, 1959 |

FOREIGN PATENTS

| | | |
|---|---|---|
| 152,774 | Australia | Aug. 11, 1953 |

OTHER REFERENCES

"A Proposed Airport Traffic Control Radar Recording System" by John McLucas (TM5-12), dated Jan. 29, 1953, Haller Raymond and Brown, Inc., State College, Pennsylvania.